(12) United States Patent
Ohuchi

(10) Patent No.: US 8,297,588 B2
(45) Date of Patent: Oct. 30, 2012

(54) MOTOR-DRIVEN VALVE

(75) Inventor: Tomoari Ohuchi, Setagaya-ku (JP)

(73) Assignee: Fujikoki Corporation, Tokyo (JP)

( * ) Notice: Subject to any disclaimer, the term of this patent is extended or adjusted under 35 U.S.C. 154(b) by 313 days.

(21) Appl. No.: 12/634,613

(22) Filed: Dec. 9, 2009

(65) Prior Publication Data

US 2010/0181514 A1 Jul. 22, 2010

(30) Foreign Application Priority Data

Jan. 22, 2009 (JP) .................................... 2009-11549
Mar. 30, 2009 (JP) .................................... 2009-81255

(51) Int. Cl.
*F16K 31/02* (2006.01)

(52) U.S. Cl. ............... 251/129.12; 251/129.13; 251/265; 251/273; 251/278

(58) Field of Classification Search ............. 251/129.11, 251/129.12, 129.13, 264, 265, 273, 278, 251/286, 287, 288
See application file for complete search history.

(56) References Cited

U.S. PATENT DOCUMENTS

| | | | | |
|---|---|---|---|---|
| 3,488,030 A | * | 1/1970 | Hulme et al. | 251/129.12 |
| 4,157,891 A | * | 6/1979 | Moriya | 431/344 |
| 5,851,003 A | * | 12/1998 | Aoki et al. | 251/288 |
| 6,764,060 B2 | * | 7/2004 | Fukano et al. | 251/129.12 |
| 2006/0043325 A1 | * | 3/2006 | Umezawa et al. | 251/129.11 |
| 2006/0261302 A1 | * | 11/2006 | Inoue et al. | 251/129.11 |
| 2006/0273272 A1 | * | 12/2006 | Uchida et al. | 251/129.11 |

* cited by examiner

*Primary Examiner* — Eric Keasel
*Assistant Examiner* — Ian Paquette
(74) *Attorney, Agent, or Firm* — Stetina Brunda Garred & Brucker

(57) ABSTRACT

To provide a motor-driven valve with a small number of parts, with excellent assemblage, capable of maintaining a large valve port diameter even downsized, and to prevent deterioration of housing environment due to sound caused by the impact and shortened life that are generated by collisions of closing limit stopper parts. A motor-driven valve according to the present invention comprises: a male screw member rotating in accordance with a rotation of a rotor of an electric motor and engaging with a female screw member fixed to a valve main body; a valve body contacting to and separating from a valve seat in the valve main body by a rotation of the male screw member; two stopper parts rotating in accordance with the rotation of the rotor of the electric motor; an opening limit stopper part mounted to the female screw member, the opening limit stopper part contacting with one of the two stopper parts in a fully-opened state of the motor-driven valve to restrict the rotation of the male screw member in a direction that the motor-driven valve opens; and a closing limit stopper part mounted to the female screw member, the closing limit stopper part contacting with another stopper part in a fully-closed state of the motor-driven valve to restrict the rotation of the male screw member in a direction that the motor-driven valve closes.

10 Claims, 16 Drawing Sheets

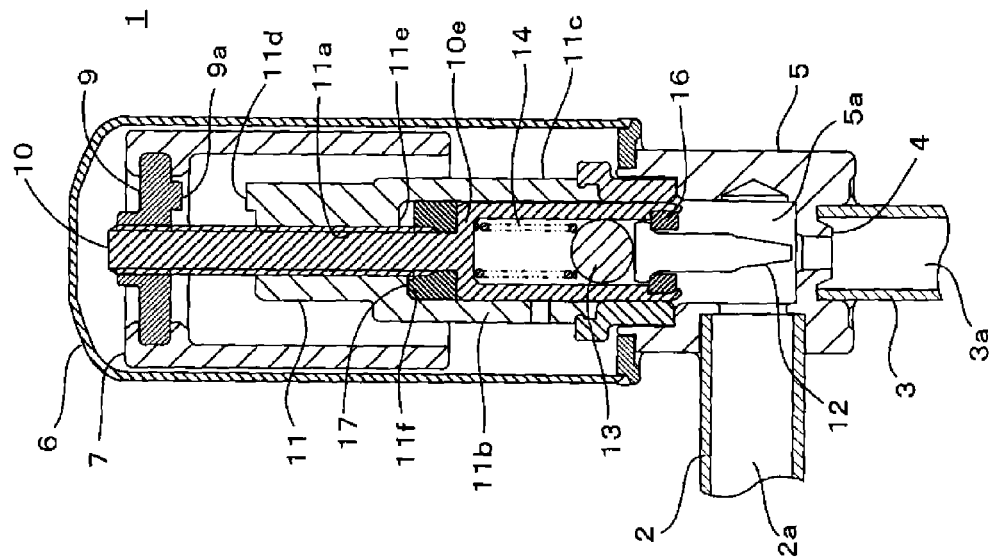
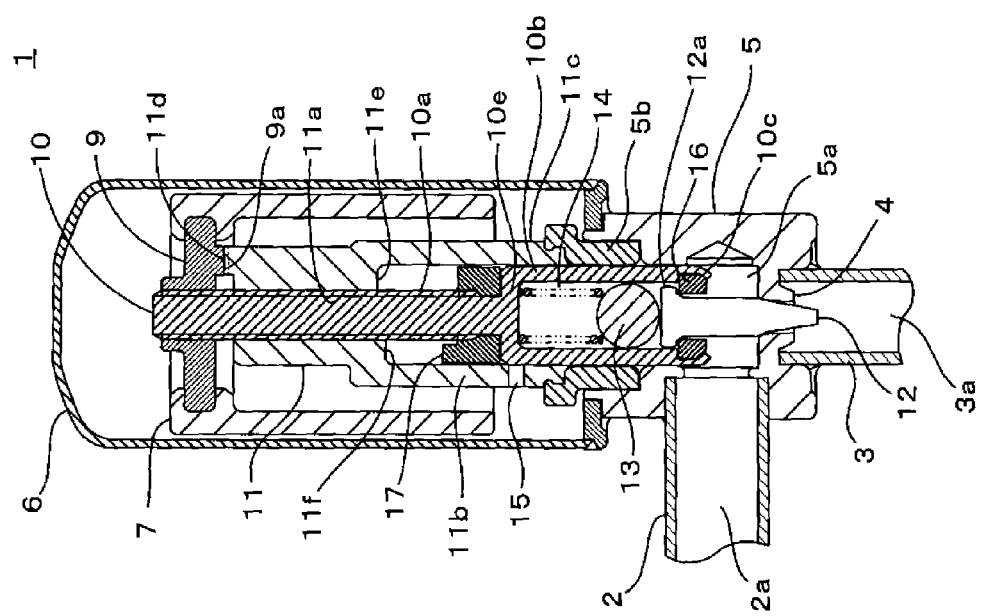

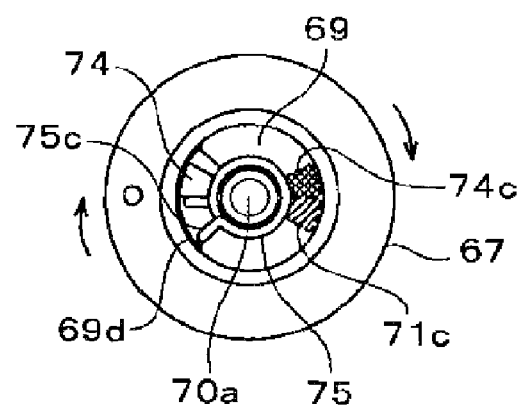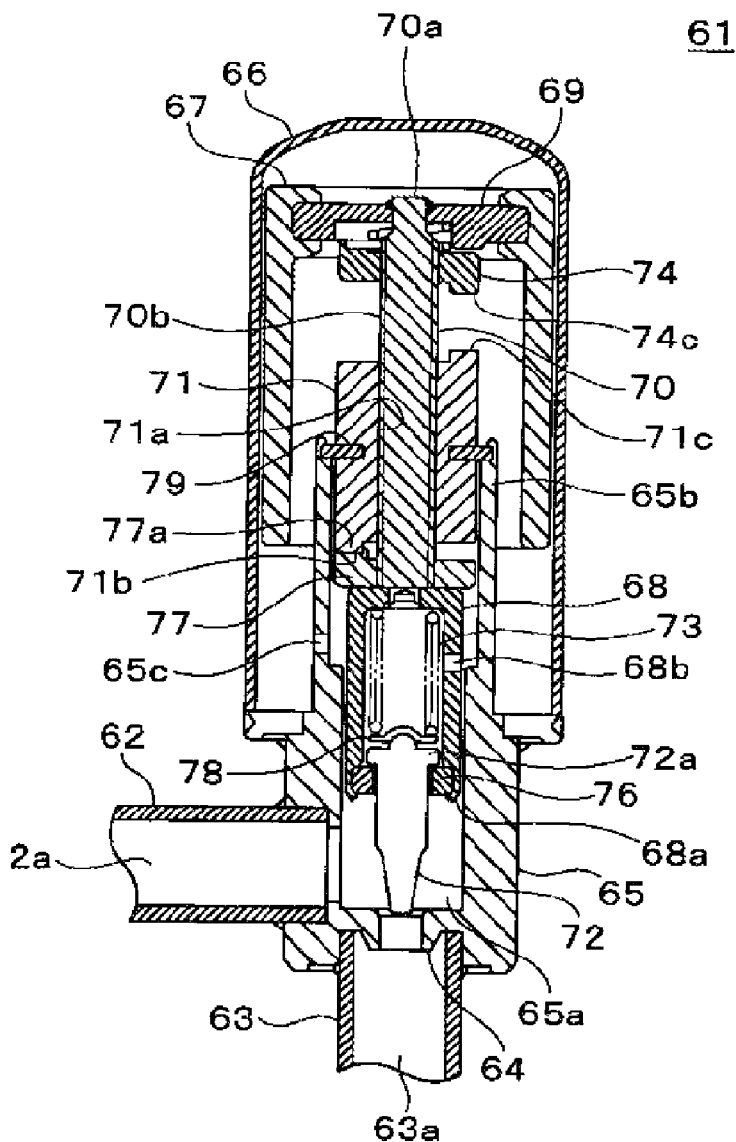
Fig. 4A

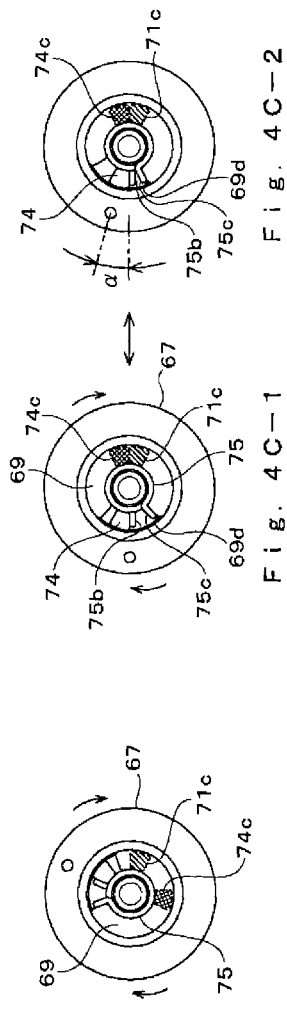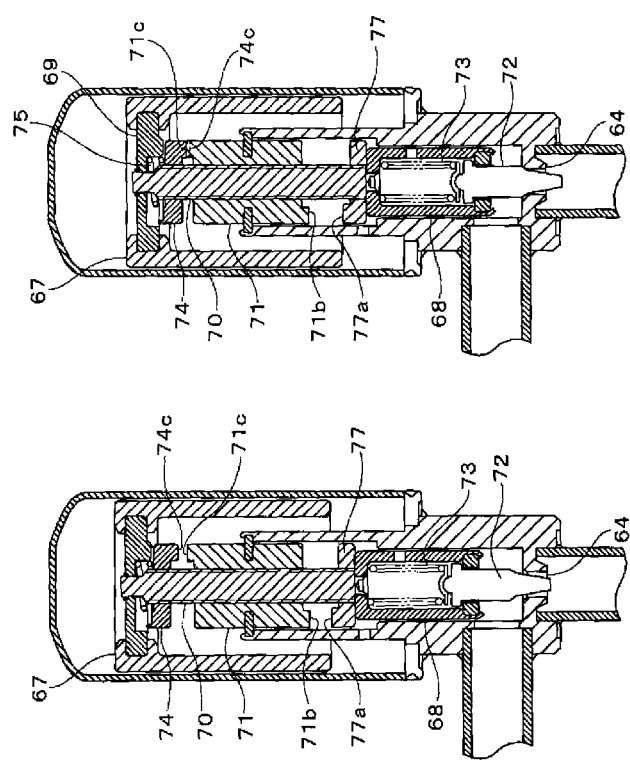

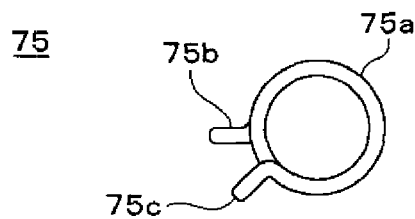
Fig. 6A
Fig. 6B
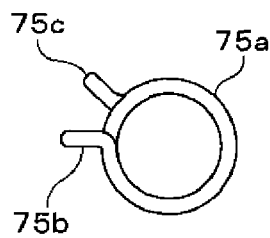
Fig. 6C
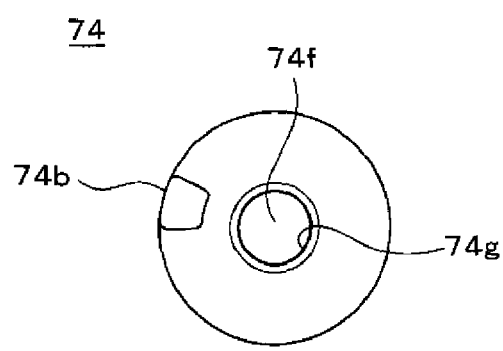
Fig. 7A
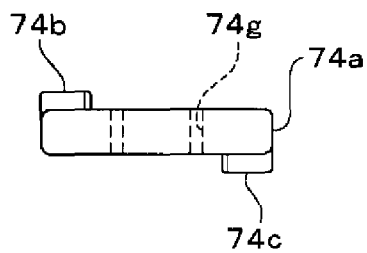
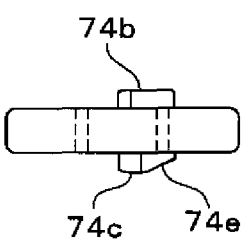
Fig. 7D

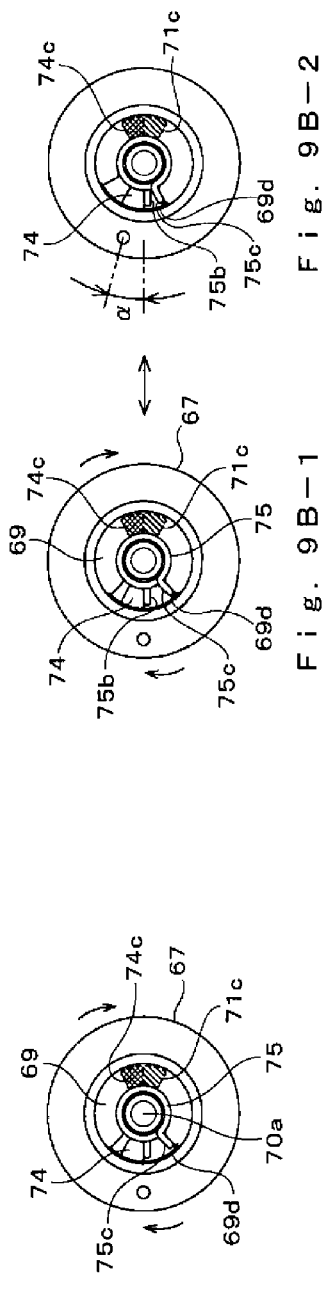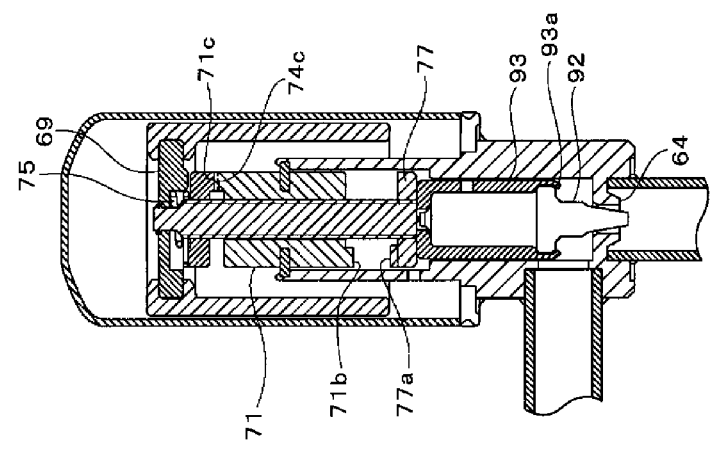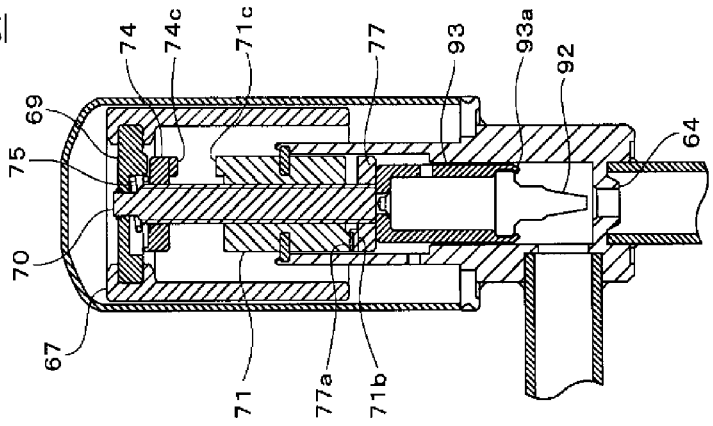

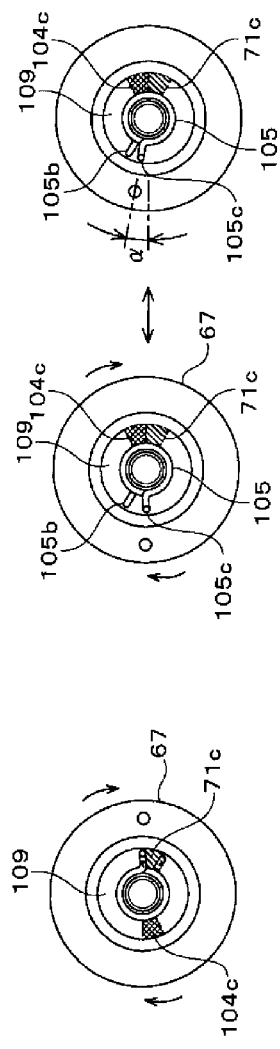
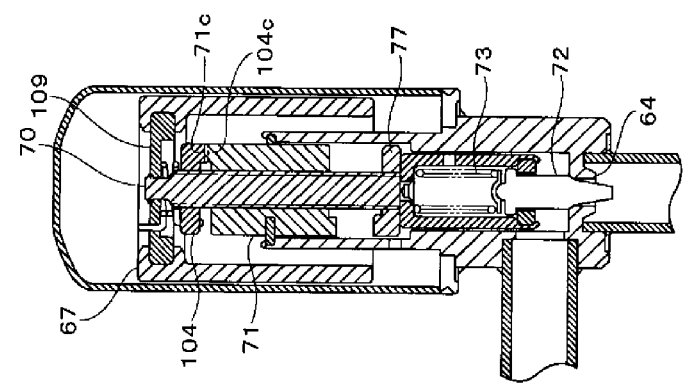
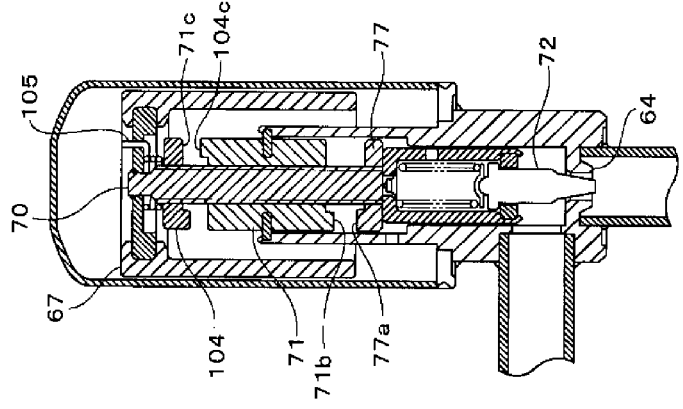

MOTOR-DRIVEN VALVE

CROSS-REFERENCE TO RELATED APPLICATIONS

The present application claims priority to Japanese Patent Application No. 2009-11549 filed on Jan. 22, 2009 and Japanese Patent Application No. 2009-81255 filed on Mar. 30, 2009.

STATEMENT RE: FEDERALLY SPONSORED RESEARCH/DEVELOPMENT

Not Applicable

BACKGROUND OF THE INVENTION

1. Field of the Invention

The present invention relates to a motor-driven valve used for flow control of a refrigerant in a refrigeration cycle system and others.

2. Description of the Related Art

As the above-mentioned motor-driven valve, in Patent document 1 is proposed a motor-driven valve with a driving mechanism for contacting and separating a valve body to/from a valve seat by utilizing a rotation of a rotor of an electric motor, and in the fully-closed state of the valve, an upper stopper body fixed to a valve shaft holder collides against a lower stopper body fixed to a guide bush to finish rotational downward movement of a valve shaft. This motor-driven valve adopts, in opening direction of the valve, a screw disengagement construction, in which the valve shaft holder is finally disengaged from the guide bush fixed to a valve main body to finish upward movement of the valve shaft.

Further, in Patent document 2 is proposed a motor-driven control valve comprising: a valve section having a valve seat, a valve body, etc.; and a stepping motor section situated above the valve section to contact and separate the valve body to/from the valve seat through rotation of a rotor, and the motor-driven control valve is provided with an opening limit stopper and a closing limit stopper above the rotor in a closed case.

Further, in Patent document 3, as illustrated in FIG. 15, is described a motor-driven valve 110 comprising: a valve main body 115 having a first flow passage 112 and a second flow passage 113 that communicate a valve chamber 111 and having a valve seat part 114 at a portion of the second flow passage 113 communicating with the valve chamber 111; a rod-shaped needle valve 117 contacting and separating to/from a valve seat 116 of the valve main body 115; a cylindrical closed case 119; a stator coil 127 disposed outside of the closed case 119; a rotor 124 that is movable in the closed case 119 in a direction that the valve opens/closes while rotating through magnetization by feeding current to the stator coil 127 and is provided with a cylindrical sleeve 122, and a cylindrical permanent magnet 123 fixed by a stop ring 126 outside the sleeve 122; and a male screw pipe 121 for opening and closing the needle valve 117 through a screw feed mechanism by the rotation of the rotor 124, in which a lower cover 120 for the closed case 119 is fixed through welding to the valve main body 115.

In this motor-driven valve 110, on a lower end portion of the sleeve 122 projects an upper closing limit stopper portion 122a, and on a flange body 118 projects a lower closing limit stopper portion 118a, in the closed state of the needle valve 117, the upper closing limit stopper portions 112a contacts with the lower closing limit stopper portion 118a to prevent the rotor 124 from further downwardly moving in the closed state of the valve.

[Patent document 1] Japanese Patent Publication No. 2006-70990 gazette.
[Patent document 2] Japanese Utility Model Publication No. Heisei 3-9565 gazette.
[Patent document 3] Japan Patent No. 3310042 gazette.

However, the screw disengagement construction of the motor-driven valve in the direction that the valve opens as shown in Patent document 1 cannot be adopted to a motor-driven valve with such construction as the engagement between the valve shaft holder and the guide bush cannot be released.

Further, in the motor-driven control valve described in Patent document 2, the opening/closing limit stoppers are positioned above the rotor, so that total length of the motor-driven control valve becomes long, and the number of parts used for the opening/closing limit stoppers becomes large as well, which causes deterioration of assembling workability of the valve, resulting in increased manufacturing cost. In addition, when such opening/closing limit stoppers are tried to be disposed in the rotor, it is necessary to shorten outer diameter of the valve shaft holder to provide a space for disposing the limit stoppers, in accordance with this, it becomes difficult to secure a space for mounting a coil spring for urging the valve body. As a result, there was a problem that downsizing of the motor-driven valve while maintaining a large valve port diameter is difficult.

Still further, in the motor-driven valve 110 described in Patent document 3 shown in FIG. 15, at an initialization processing, for instance, in which the motor-driven valve is driven to close the valve with the number of pulses beyond overall stroke from the fully-opened position to the fully-closed position to forcibly transit the opening of the motor-driven valve to the fully-closed state, the upper closing limit stopper portion 122a downwardly moving in accordance with the rotation of the rotor 124 contacts with the lower closing limit stopper portion 118a, which generates frequent impact sounds, so that using this motor-driven valve 110 for room air conditioners or the like results in a problem of deterioration of housing environment.

In addition, it is necessary to construct the motor-driven valve 110 such that the upper closing limit stopper portion 122a and the lower closing limit stopper portion 118a do or do not contact with each other during one rotation of the sleeve 122, so that areas of the both stopper portion 122a, 118a that contact with each other are set small, which causes a problem of shortened life of the motor-driven valve 110 as a product due to wear and deterioration of the both stopper portions 122a, 118a caused by the above-mentioned impacts.

Especially, in a motor-driven valve like the above motor-driven valve 110 with a coil spring 130 urging the needle valve 117 to the valve seat 116 after the needle valve 117 is seated on the valve seat 116 until the upper closing limit stopper portion 122a contacts with the lower closing limit stopper portion 118a, that is, the fully-opened state, the coil spring 130 relaxes the impact to a certain degree when the upper closing limit stopper portion 122a collides against the lower closing limit stopper portion 118a. On the other hand, a motor-driven valve with simple construction without such coil spring 130 has a serious problem of the above impacts.

BRIEF SUMMARY OF THE INVENTION

The present invention has been made in consideration of the problems of the above-mentioned conventional motor-driven valves, and the object thereof is to provide a motor-driven valve with a small number of parts, easily assembled, capable of maintaining a large valve port diameter even downsized, and capable of preventing deterioration of housing environment due to impact sounds and shortened life of the motor-driven valve caused by contacts between the both closing limit stopper portions.

To achieve the above object, the present invention relates to a motor-driven valve, and the motor-driven valve comprises: a male screw member rotating in accordance with a rotation of a rotor of an electric motor and engaging with a female screw member fixed to a valve main body; a valve body contacting to and separating from a valve seat in the valve main body by a rotation of the male screw member; two stopper parts rotating in accordance with the rotation of the rotor of the electric motor; an opening limit stopper part mounted to the female screw member, the opening limit stopper part contacting with one of the two stopper parts in a fully-opened state of the motor-driven valve to restrict the rotation of the male screw member in a direction that the motor-driven valve opens; and a closing limit stopper part mounted to the female screw member, the closing limit stopper part contacting with another stopper part in a fully-closed state of the motor-driven valve to restrict the rotation of the male screw member in a direction that the motor-driven valve closes.

With the motor-driven valve according to the present invention, since to the female screw member are mounted two stopper parts functioning in fully-opened and fully-closed states of the motor-driven valve, it is possible to provide a motor-driven valve downsized, with a small number of parts and with excellent assemblage. In addition, to the female screw member are mounted the both of the opening/closing limit stoppers, so that the relation in position between the opening/closing limit stoppers can also be stabilized. In this connection, when the two stopper parts rotating in accordance with the rotation of the rotor are screwed with the male screw member, the two stopper parts are positioned against the opening/closing limit stoppers based on a screw, which allows the relation in relative position between them to accurately be determined.

In the above motor-driven valve, the other stopper part contacting with the closing limit stopper part of the female screw member can be mounted to one of a support ring for connecting the rotor and the male screw member, and the rotor. Further, the other stopper part contacting with the closing limit stopper part of the female screw member can be mounted on a side surface of the male screw member.

In addition, in the motor-driven valve described above, the opening and closing limit stopper parts can integrally be formed with the female screw member, which makes it possible to further reduce the number of parts and improve assembling property of a motor-driven valve.

Further, in the motor-driven valve, between the male screw member and the valve body may be mounted a spring accommodating part with a larger outer diameter than the male screw member and with a coil spring therein, and the coil spring urges the valve body toward the valve seat, and on an outer surface of the spring accommodating part on the rotor side can be mounted the one of the two stopper parts. With this, a space for mounting the coil spring is sufficiently secured, which provides a downsized motor-driven valve while maintaining a large valve port diameter.

Still further, the present invention relates to a motor-driven valve, and the motor-driven valve comprises a first screw member fixed to a valve main body; a second screw member rotating in accordance with a rotation of a rotor of an electric motor and engaging with the first screw member; a valve body contacting to and separating from a valve seat in the valve main body by a rotation of the second screw member; an upper closing limit stopper part rotating in accordance with the rotation of the rotor; a lower closing limit stopper part mounted to the first screw member, and contacting with the upper closing limit stopper part in a fully-closed state of the motor-driven valve to restrict the rotation of the second screw member in a direction that the valve closes; and a shock absorbing member for relaxing an impact when the upper closing limit stopper part collides against the lower closing limit stopper part.

With the motor-driven valve according to the present invention, the shock absorbing member is able to relax an impact when the upper closing limit stopper part collides against the lower closing limit stopper part, which reduces impact sound generated at the contact of the both stopper parts and reduces load to the both stopper parts, resulting in improved housing environment and a longer life in use of the motor-driven valve.

In the motor-driven valve, the shock absorbing member may be a coil spring urging the upper closing limit stopper part in a direction opposite to a direction that the upper closing limit stopper part collides against the lower closing limit stopper part. And, it is possible that the upper closing limit stopper part is screwed with the second screw member, and the coil spring is mounted to one of a support ring for connecting the rotor and the second screw member, and the rotor.

Further, the above motor-driven valve may have the valve body fixed to a tip portion of the second screw member on the valve seat side. Such motor-driven valve is not provided with relaxation means such as a coil spring between the valve body and the second screw member, so that the impact when the upper closing limit stopper part collides against the lower closing limit stopper part becomes especially large, in this invention, with the relaxation member, the impact when the upper closing limit stopper part collides against the lower closing limit stopper part can be relaxed, which provides a motor-driven valve with simple structure while reducing impact sound at the closing stopper parts and loads to the closing stopper parts.

In addition, the present invention relates to a motor-driven valve, and the motor-driven valve comprises: a male screw member rotating in accordance with a rotation of a rotor of an electric motor and engaging with a female screw member fixed to a valve main body; a valve body contacting with and separating from a valve seat in the valve main body by a rotation of the male screw member; two stopper parts rotating in accordance with the rotation of the rotor of the electric motor; an opening limit stopper part mounted to the female screw member, the opening limit stopper part contacting with one of the two stopper parts in a fully-opened state of the motor-driven valve to restrict the rotation of the male screw member in a direction that the motor-driven valve opens; a closing limit stopper part mounted to the female screw member, the closing limit stopper part contacting with another stopper part in a fully-closed state of the motor-driven valve to restrict the rotation of the male screw member in a direction that the motor-driven valve closes; and a shock absorbing member for relaxing an impact when the other stopper part collides against the closing limit stopper part.

With the motor-driven valve according to the present invention, to the female screw member are mounted two stopper parts functioning in fully-opened and fully-closed states, therefore, it is possible to provide a motor-driven valve downsized, with a small number of parts and with excellent assemblage. In addition, to the female screw member are mounted the both of the opening/closing limit stoppers, so that the relation in position between the opening/closing limit stoppers can also be stabilized. Further, the shock absorbing member is able to relax an impact when the upper closing limit stopper part collides against the lower closing limit stopper part, which reduces impact sound generated at the contact of the both stopper parts and reduces load to the both stopper parts, resulting in improved housing environment and a longer life in use of the motor-driven valve.

As described above, with the present invention in which a device is added to the construction of opening/closing limit stoppers of a valve body of a motor-driven valve, it is possible to provide a motor-driven valve with a small number of parts, easily assembled, capable of maintaining a large valve port diameter even downsized, and capable of preventing deterioration of housing environment due to impact sound and shortened life of the motor-driven valve caused by contacts between the closing limit stopper parts.

BRIEF DESCRIPTION OF THE DRAWINGS

The present invention will be more apparent from the ensuring description with reference to the drawings, wherein:

FIGS. 1A and 1B are cross-sectional views of a motor-driven valve according to the first embodiment of the present invention, and FIG. 1A shows the fully-closed state and FIG. 1B the fully-opened state;

FIG. 2A shows the fully-closed state and FIG. 2B the fully-opened state;

FIG. 3A shows the fully-closed state and FIG. 3B the fully-opened state;

FIGS. 4A to 4C show a motor-driven valve according to the fourth embodiment of the present invention, and FIG. 4A is a cross-sectional view in the fully-opened state, FIG. 4B a cross-sectional view in the intermediately-opened state, FIG. 4C a cross-sectional view in the fully-closed state, in each top view, a can and a support ring are illustrated as they were transparent;

FIG. 5A is a plan view, FIG. 5B a cross-sectional view taken along the line A-A in FIG. 5A, FIG. 5C a bottom view;

FIGS. 6A to 6C show a coil spring used for the motor-driven valve shown in FIGS. 4A to 4C, and FIG. 6A is a plan view, FIG. 6B a front view, FIG. 6C a bottom view;

FIGS. 7A to 7D show an upper closing limit stopper part used for the motor-driven valve shown in FIGS. 4A to 4C, and FIG. 7A is a plan view, FIG. 7B a front view, FIG. 7C a bottom view, FIG. 7D a side view;

FIGS. 9A and 9B show a motor-driven valve according to the fifth embodiment of the present invention, and FIG. 9A is a cross-sectional view in the fully-opened state, FIG. 9B a cross-sectional view in the fully-closed state, in each top view, a can and a support ring are illustrated as they were transparent;

FIGS. 10A to 10C show a motor-driven valve according to the sixth embodiment of the present invention, and FIG. 10A is a cross-sectional view in the fully-opened state, FIG. 10B a cross-sectional view in the intermediately-opened state, FIG. 10C a cross-sectional view in the fully-closed state, in each top view, a can and a support ring are illustrated as they were transparent;

FIG. 11A is a plan view, FIG. 11B a cross-sectional view taken along the line B-B in FIG. 11A, FIG. 11C a bottom view;

FIG. 12A is a plan view, FIG. 12B a front view, FIG. 12C a bottom view;

FIG. 13A is a plan view, FIG. 13B a front view, FIG. 13C a bottom view, FIG. 13D a side view;

DETAILED DESCRIPTION OF THE INVENTION

Figure 2A:
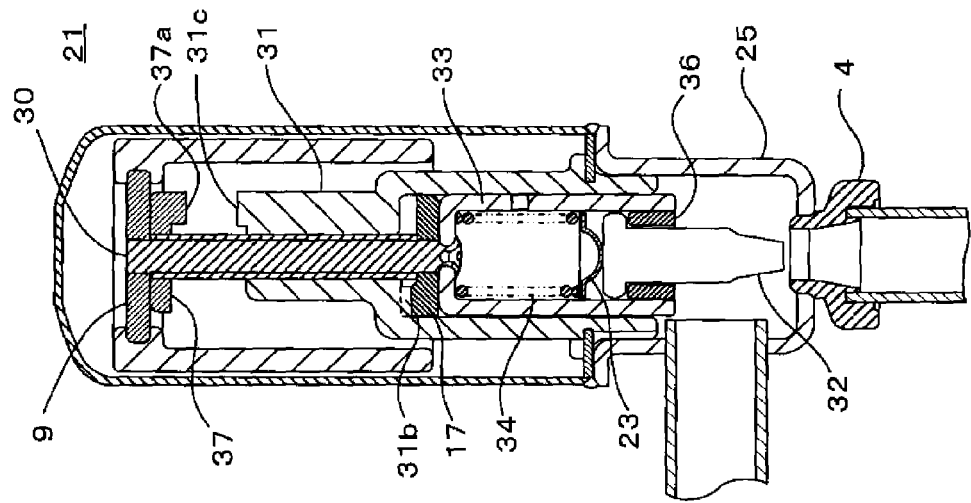
FIGS. 2A and 2B are cross-sectional views of a motor-driven valve according to the second embodiment of the present invention.

Next, embodiments of the present invention will be explained with reference to drawings.

FIGS. 1A, 1B show a motor-driven valve according to the first embodiment of the present invention, and FIG. 1A shows a cross-sectional view of the fully-closed state and FIG. 1B shows that of the fully-opened state. This motor-driven valve 1 comprises: a valve main body 5 with two conduits 2, 3 and a valve seat 4; a can 6 fixed to the valve main body 5; a rotor 7 disposed inside the can 6 and composes a part of an electric motor; a stator (not shown) fixed on an outer peripheral portion of the can 6 to rotationally drive the rotor 7; a valve shaft (a male screw member) 10 integrally connected to the rotor 7 through a support ring 9; a valve shaft holder (a female screw member) 11 whose lower end portion is press-fitted and fixed to the valve main body 5 and to which the valve shaft 10 is inserted; a valve body 12 engaged with a lower end portion of the valve shaft 10; and so on.

The valve main body 5 is formed to be cylindrical and is provided with a valve chamber 5a communicating with two flow passages 2a, 3a formed with the two conduits 2, 3. Between the valve chamber 5a and the flow passage 3a is situated the valve seat 4, and causing the valve body 12 to contact to and separate from the valve seat 4 closes/opens the motor-driven valve 1.

The can 6 is formed to be a cylinder with an opening bottom portion and a closed top portion and is fixed to an upper portion of the valve main body 5. Inside the can 6 are accommodated main parts such as the rotor 7.

The rotor 7 is formed to be cylindrical and is rotatably arranged inside the can 6. This rotor 7 is integrally connected with the valve shaft 10 through the support ring 9 fixed to an upper portion of the rotor 7. To the support ring 9 is integrally formed an upper closing limit stopper portion 9a so as to project toward the top face of the valve shaft holder 11. The rotor 7 and the stator fixed on an outer peripheral portion of the can 6 compose the electric motor, and electric supply to the stator rotates the rotor 7.

In the valve shaft 10, a male screw part 10a is formed at an upper portion thereof, and a lower end portion 10c opens downward to form a spring accommodating portion 10b with a ceiling portion 10e, and to the lower end portion 10c is fixed a stopper ring 16 of the valve body 12 through caulking. In the spring accommodating portion 10b is contracted and mounted a coil spring 14, for relaxation, urging the valve body 12 downward through a ball 13. On a face of the ceiling portion 10e on the male screw portion 10a side is mounted a lower opening limit stopper part 17 that is screwed and fixed to the male screw portion 10a.

The valve shaft holder 11 is made of resin, and a female screw portion 11a is formed on an upper portion thereof, and below the female screw portion 11a is mounted a cylindrical fitting portion 11b with a ceiling portion 11e. This fitting portion 11b is arranged on an outer periphery of the spring accommodating portion 10b, and a lower end portion 11c downwardly opens. And, the valve shaft holder 11 is integrally formed with a connection hold part 5b, and the connection hold part 5b is fixed to the valve main body 5 by press-insertion. In addition, the female screw portion 11a of the valve shaft holder 11 and the male screw portion 10a of the valve shaft 10 engage with each other to allow the valve shaft 10 to vertically be guided in the valve shaft holder 11. Moreover, on the top face of the valve shaft holder 11 is formed a lower closing limit stopper portion 11d, and a face of the ceiling portion 11e on the spring accommodating portion 10b side is formed an upper opening limit stopper portion 11f. On a side face of the valve shaft holder 11 is drilled a pressure-equalization hole 15 to equalize pressures between the valve chamber 5a and the can 6.

The valve body 12 has a cone-like portion at its lower portion and is formed cylindrical on the whole. An upper portion 12a of the valve 12 is inserted into the spring accommodating portion 10b of the valve shaft 10 and is prevented from escaping by the stopper ring 16 of the valve shaft 10.

Next, the motion of the motor-driven valve 1 with the above-mentioned construction will be explained with referring to FIGS. 1A, 1B.

When the motor-driven valve 1 is closed, in the state shown in FIG. 1B, to the stator is fed electric current in a direction and is excited, which allows the rotor 7 to rotate clockwise in top view and the valve shaft 10 also to simultaneously rotate downward, allowing the valve body 12 to seat on the valve seat 4 to close the motor-driven valve 1.

At the moment the valve body 12 seats on the valve seat 4, the upper closing limit stopper portion 9a does not reach to the lower closing limit stopper portion 11d, the rotor 7 is further rotatable. The moment that the rotor 7 further rotates clockwise in top view and the upper closing limit stopper portion 9a contacts with the lower closing limit stopper portion 11d, the rotation of the rotor 7 is forcibly stopped.

Moreover, when the valve body 12 seats on the valve seat 4, the movement of the valve body 12 stops, but since the valve shaft 10 further descends, the coil spring 14 is compressed to press the valve body 12 to the valve seat 4, then the operation ends with the posture shown in FIG. 1A.

On the other hand, when the motor-driven valve 1 is opened, in the state shown in FIG. 1A, to the stator is fed electric current in a direction opposite to the above and is excited, which allows the rotor 7 to rotate counterclockwise in top view and the valve shaft 10 to move upward, allowing the valve body 12 to separate from the valve seat 4 to open the motor-driven valve 1. Then, the rotor 7 further rotates and the lower opening limit stopper part 17 contacts with the upper opening limit stopper portion 11f, which allows the rotation of the rotor 7 to stop and the rise of the valve body 12 also to stop.

As mentioned above, in this embodiment, since the two stopper portions 11d, 11f functioning in fully-opened and fully-closed states of the motor-driven valve 1 are integrally formed on the valve shaft holder 11, it becomes possible to downsize the motor-driven valve 1 and reduce the number of parts, moreover, integrally forming the two stopper portions 11d, 11f on the valve shaft holder 11 allows the relation in position between the two stopper portions 11d, 11f to be stabilized, resulting in improved assembling operability.

Further since the spring accommodating portion 10b for accommodating the coil spring 14 is formed on the valve shaft 10, and the outer diameter of this spring accommodating portion 10b is formed to be larger than that of the male screw portion 10a, and the lower opening limit stopper part 17 is mounted on the outer surface of the spring accommodating part 10b on the rotor 7 side, it becomes possible to secure a space sufficient to mount the coil spring 14 and downsize the motor-driven valve 1 while maintaining a large valve port.

In addition, in the embodiment mentioned above, though the lower opening limit stopper part 17 is constructed to be a different member from the valve shaft 10, the stopper part 17 can integrally be formed with the valve shaft 10 from the viewpoint of reducing the number of parts and improving assemblage.

Moreover, although the lower closing limit stopper portion 11d is formed on the top face of the valve shaft holder 11, the position of the stopper portion 11d is not necessarily limited to the top face of the valve shaft holder 11, but the stopper portion 11d may be arranged on the side face portion of the valve shaft holder 11. In this case, the position of the upper closing limit stopper portion 9a is also changed to outside in the radial direction.

Next, a motor-driven valve according to the second embodiment of the present invention will be explained with reference to FIGS. 2A, 2B.

This motor-driven valve 21 is different from the motor-driven valve 1 shown in FIGS. 1A, 1B as follows. That is, between a valve shaft 30 and a valve body 32 is mounted a spring accommodating portion 33, and a coil spring 34 is contracted and mounted in the spring accommodating portion 33 to press the valve body 32 through a downwardly projecting bowl-like member 23. Further, a valve main body 25 is formed to be a thin-walled bowl, and a valve shaft holder 31 formed of resin is fixed through welding or the like to the valve main body 25 via a connection ring 35. On the side surface of the upper end of the valve shaft 30 is screwed a stopper member 37 with an upper closing limit stopper portion 37a; on an inner wall of a ceiling portion of a fitting portion 31a of the valve shaft holder 31 is formed an upper opening limit stopper portion 31b; and at an upper end of the valve shaft holder 31 is formed a lower closing limit stopper portion 31c. The valve body 32 is prevented from escaping by a stopper ring 36 that is press-fitted and fixed to the spring accommodating portion 33 caulked at a lower end portion 30a of the valve shaft 30. The reason why the bowl-like member 23, the thin valve main body 25 and the valve shaft holder 31 formed of resin is to lighten the motor-driven valve 21. Other constituents of the motor-driven valve 21 are the same as those of motor-driven valve 1 of the first embodiment, so that like symbols are applied to like parts of the first embodiment, and repeated explanations will be omitted.

The motor-driven valve 21 of the above construction is also able to function as a valve with a fully-opened state and a fully-closed state in the same manner as the motor-driven valve 1, and it is possible to provided a motor-driven valve with a small number of parts, with excellent assemblage, capable of maintaining a large valve port diameter even downsized, and capable of attaining further lightening of weight.

Figure 3A:
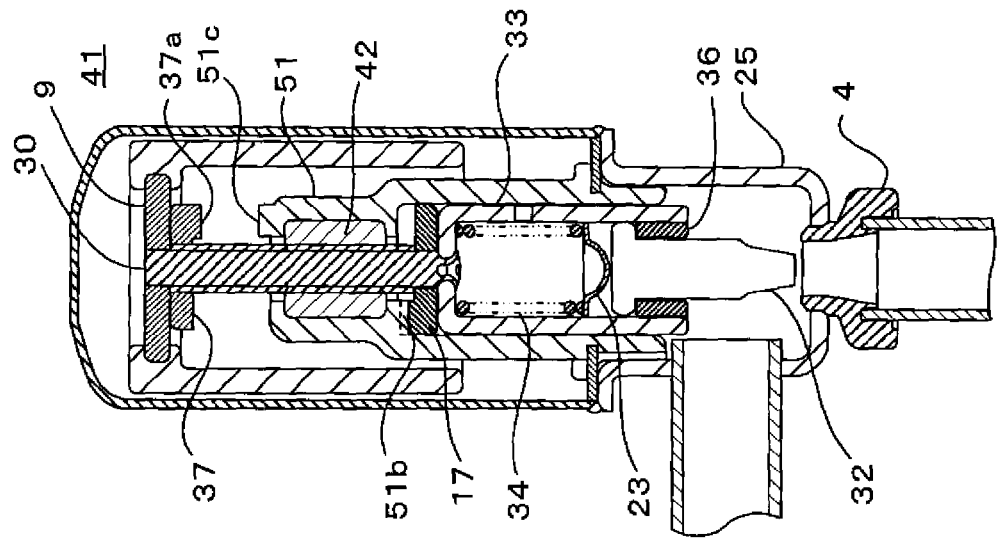
FIGS. 3A and 3B are cross-sectional views of a motor-driven valve according to the third embodiment of the present invention.
Figure 3B:
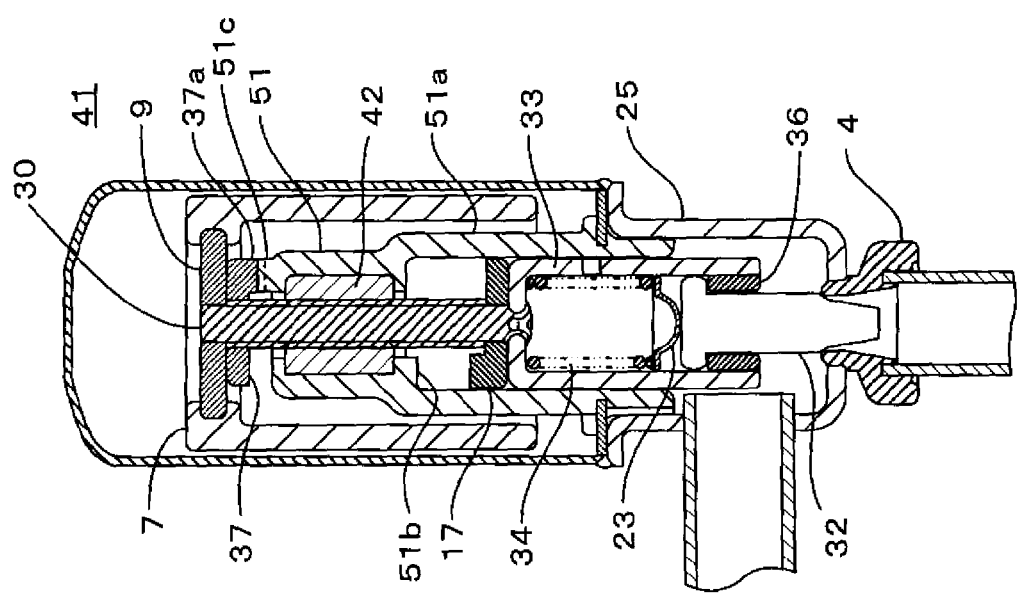

Next, a motor-driven valve according to the third embodiment of the present invention will be explained with reference to FIGS. 3A, 3B.

Figure 2B:
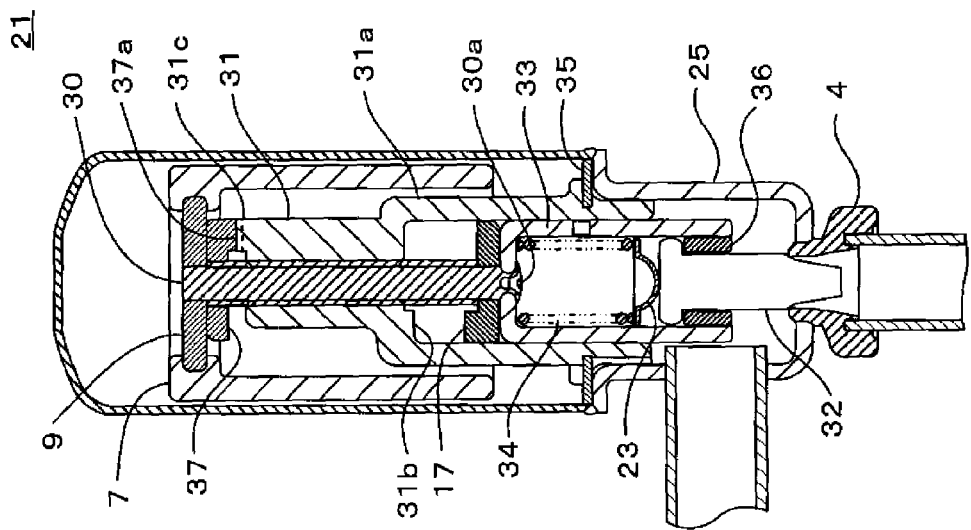

This motor-driven valve 41 is different from the motor-driven valve 21 shown in FIGS. 2A, 2B in that a female screw portion 42 made of metal is integrally formed with a valve shaft holder 51. On an inner face of a ceiling part of a fitting portion 51*a* of the valve shaft holder 51 is formed an upper opening limit stopper portion 51*b*, and on an upper end of the valve shaft holder 51 is formed a lower closing limit stopper portion 51*c*. The valve shaft holder 51 and the female screw portion 42 compose a female screw member of the present invention. Other constituents are the same as those of the motor-driven valve 21. The reason why the female screw portion 42 made of metal is integrally formed with the valve shaft holder 51 is providing freedom to optionally select material (abrasion resistance) of the female screw portion 42 in accordance with its usage.

The motor-driven valve 41 of the construction described above is also able to function as a valve with a fully-opened state and a fully-closed state in the same manner as the motor-driven valves 1, 21, and it is possible to provided a motor-driven valve with a small number of parts, with excellent assemblage, capable of maintaining a large valve port diameter even downsized.

Next, a motor-driven valve according to the fourth embodiment of the present invention will be explained with reference to FIGS. 4A to 4C. In FIGS. 4A to 4C of cross-sectional views, FIG. 4A shows a fully-opened state of the motor-driven valve, FIG. 4B an intermediately-opened state, FIG. 4C a fully-closed state. This motor-driven valve 61 comprises: a valve main body 65 with two conduits 62, 63 and a valve seat 64; a can 66 fixed to the valve main body 65; a rotor 67 disposed inside the can 66 and composes a part of an electric motor; a stator (not shown) fixed on an outer peripheral portion of the can 66 to rotationally drive the rotor 67; a valve shaft (a second screw member) 70 integrally connected to the rotor 67 through a support ring 69; a valve shaft holder (a first screw member) 71 whose lower end portion is press-fitted and fixed to the valve main body 65 and to which the valve shaft 70 is inserted; a valve body 72 engaged with a spring accommodating portion 68 fixed to a lower end portion of the valve shaft 70; and so on.

The valve main body 65 is formed to be cylindrical and is provided with a valve chamber 65*a* communicating with two flow passages 62*a*, 63*a* formed with the two conduits 62, 63. Between the valve chamber 65*a* and the flow passage 63*a* is situated the valve seat 64, and causing the valve body 72 to contact to and separate from the valve seat 64 closes/opens the motor-driven valve 61. On an upper side face of the valve main body 65 is drilled a pressure-equalization hole 65*c* to equalize pressures between the valve chamber 65*a* and the can 66.

The can 66 is formed to be a cylinder with an opening bottom portion and a closed top portion and is fixed to an upper portion of the valve main body 65. Inside the can 66 are accommodated main parts such as the rotor 67.

The rotor 67 is formed to be cylindrical and is rotatably arranged inside the can 66. This rotor 67 is integrally connected with the valve shaft 70 through the support ring 69 fixed to the upper portion of the rotor 67. The rotor 67 and the stator fixed to an outer peripheral portion of the can 66 compose the electric motor, and electric supply to the stator rotates the rotor 67.

Figure 5A:
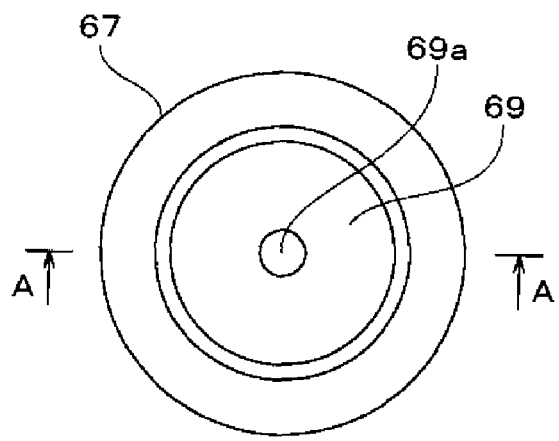
FIGS. 5A to 5C show a rotor, to which a support ring is integrally formed, of the motor-driven valve shown in FIGS. 4A to 4C.
Figure 5B:
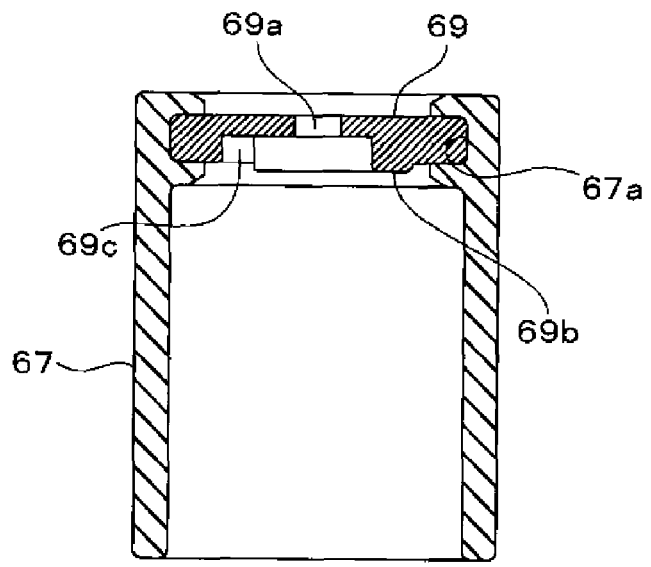
Figure 5C:
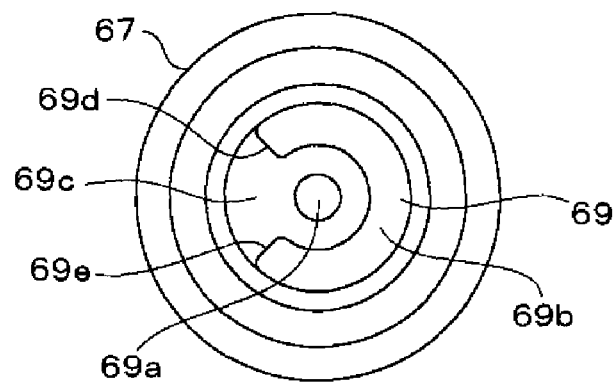
Figure 7C:
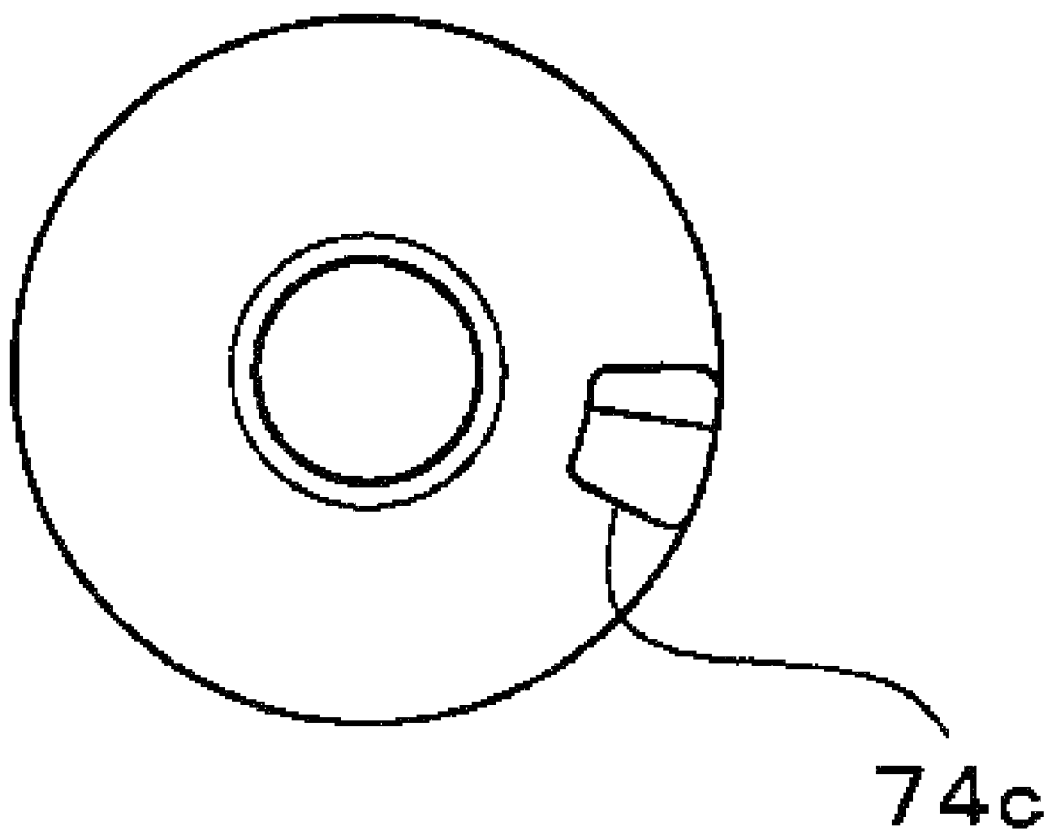

FIGS. 5A to 5C show a condition that at an upper portion of the rotor 67 is fixed the support ring 69. To a channel portion 67*a* of the rotor 67 is accommodated and fixed an outer peripheral edge portion of the disk-like support ring 69. At the central portion of the support ring 69 is drilled a hole portion 69*a*, and the support ring 69 is provided with a projecting portion 69*b* further downwardly projecting and a spring accommodating portion 69*c* for accommodating a coil spring 75 (shown in FIGS. 4A to 4C) as a relaxing member. Since the shape of the support ring 69 is complicated, it is possible to integrally form the support ring 69 with the rotor 67 at the formation of the rotor 67, in such a case, a metal bush may be mounted to a central portion including the hole portion 69*a* only.

The coil spring 75 accommodated in the spring accommodating portion 69*c* of the support ring 69 is, as shown in FIGS. 6A to 6C, provided with projecting portions 75*b*, 75*c* that are upper and lower end portions of the spring main body 75*a* projects outside. The projecting portion 75*c* contacts with an end portion 69*d* of the projecting portion 69*b* of the support ring 69 shown in FIG. 5C under the condition that the coil spring 75 is accommodated in the spring accommodating portion 69*c* of the support ring 69 to prevent the whole of the coil spring 75 from idling in the spring accommodating portion 69*c*.

As illustrated in FIGS. 7A to 7D, an upper closing limit stopper part 74 is formed to be ring-shaped, and to a hole portion 74*f* drilled at a central portion of a base portion 74*a* is screwed a female screw portion 74*g*. On the top face of the upper closing limit stopper part 74 projects a projecting portion 74*b* engaging with the coil spring 75, and on the bottom face projects an upper closing limit stopper portion 74*c* contacting with a lower closing limit stopper portion 71*c* of the valve shaft holder 71 respectively, and the upper closing limit stopper portion 74*c* is provided with an inclined face 74*e*.

Figure 8:
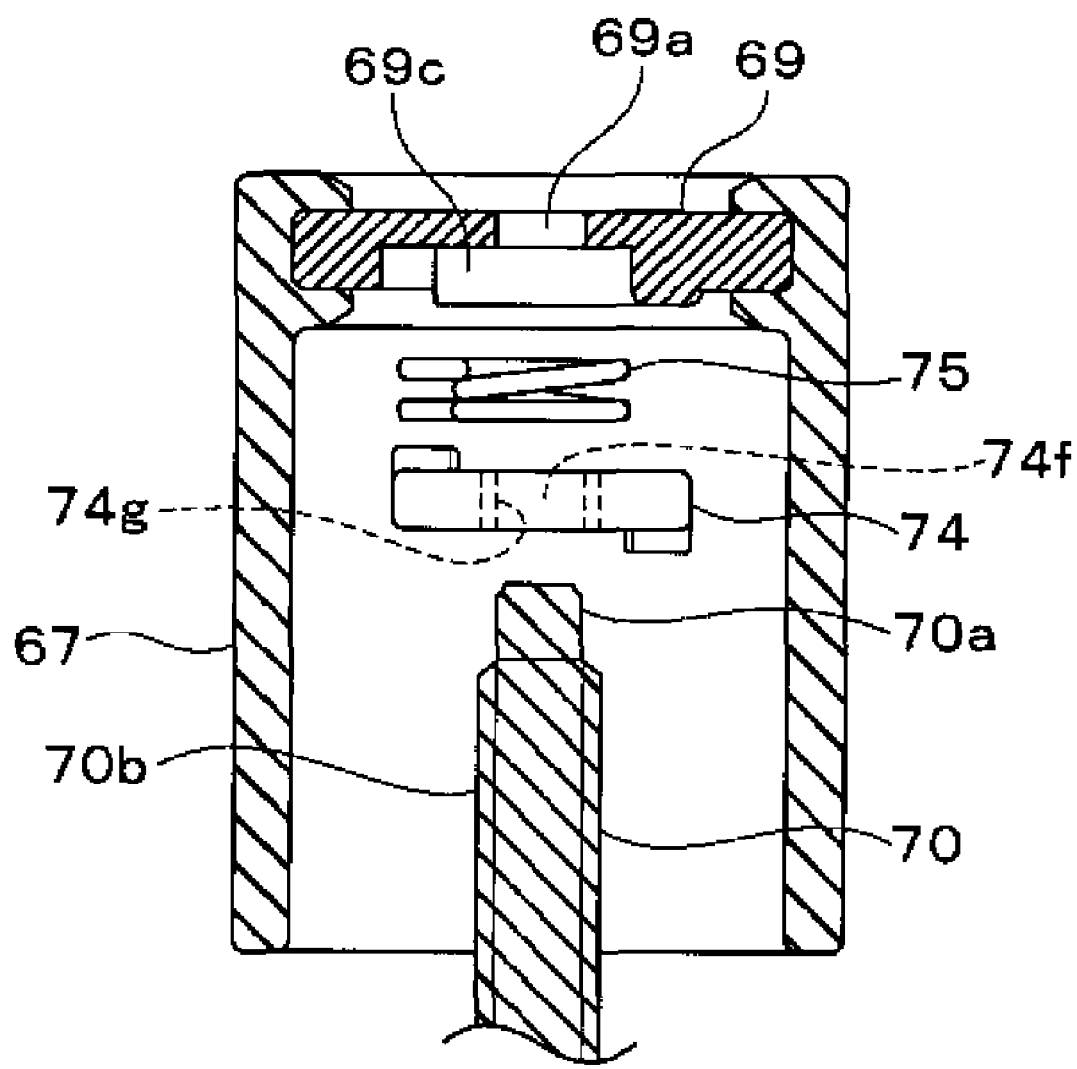
FIG. 8 is a fragmented cross-sectional view for explaining a manner to mount the parts shown in FIG. 5A to 7D to a valve shaft.

When mounting the support ring 69 (shown in FIGS. 5A to 5C) to which the rotor 67 is integrally formed, the upper closing limit stopper part 74 (shown in FIGS. 7A to 7D) and the coil spring 75 (shown in FIGS. 6A to 6C) to the valve shaft 70, as shown in FIG. 8, after the valve shaft 70 is inserted from an upper end portion 70*a* side into the hole portion 74*f* of the upper closing limit stopper part 74, with a male screw portion 70*b* is engaged the female screw portion 74*g*, and under the condition that the coil spring 75 is accommodated in the spring accommodating portion 69*c* of the support ring 69, the upper end portion 70*a* of the valve shaft 70 is inserted into the hole portion 69*a* of the support ring 69 to obtain the condition shown in FIG. 4A, and the upper end portion 70*a* of the valve shaft 70 is fixed to the top face of the support ring 69.

As shown in FIGS. 4A to 4C, the valve shaft 70 is provided with the male screw portion 70*b* almost whole of the valve shaft 70, and at a lower end of the valve shaft 70 is fixed the spring accommodating portion 68 through caulking. To a lower end portion of the valve shaft 70 is mounted a lower opening limit stopper part 77 which is fixed above the spring accommodating portion 68 and screwed with the male screw portion 70*b*. To the lower opening limit stopper 77 is formed a lower opening limit stopper portion 77*a* so as to project on the top face thereof.

The spring accommodating portion 68 is provided to accommodate a coil spring 73 downwardly urging the valve body 72 via a pressing plate 78 in the state that the coil spring 73 is contracted, and to a lower end portion 68*a* is fixed a stopper ring 76 of the valve body 72 through caulking. Further, on a side face of the spring accommodating portion 68 is drilled a pressure-equalization hole 68*b* to equalize pressures between the valve chamber 65*a* and the can 66, and the spring accommodating portion 68.

The valve shaft holder 71 is made of resin, and a female screw portion 71*a* is formed so as to vertically penetrate the valve shaft holder 71, and on the bottom face projects an upper opening limit stopper portion 71*b*. This valve shaft holder 71 is fixed at an upper end portion 65*b* of the valve main body 65 through the ring 79. The female screw portion 71a of the valve shaft holder 71 and the male screw portion 70b of the valve shaft 70 are engaged with each other to vertically guide the valve shaft 70 in the valve shaft holder 71. In addition, on the top face of the valve shaft holder 71 projects the lower closing limit stopper portion 71c.

The valve body 72 is provided with a cone-shaped portion at a lower portion thereof, and is cylindrically formed on the whole. An upper portion 72a of the valve body 72 is inserted into the spring accommodating portion 68, and is prevented from escaping by the stopper ring 76.

Next, the motion of the motor-driven valve 61 with the above construction will be explained with reference to FIGS. 4A to 4C.

When the motor-driven valve 61 is closed, in the state shown in FIG. 4A, to the stator is fed electric current in a direction and is excited, which allows the rotor 67 to rotate clockwise in top view and the valve shaft 70 also to simultaneously rotate downward, via the intermediate valve opening state shown in FIG. 4B, as illustrated in the cross-sectional view of FIG. 4C, which allows the valve body 72 to seat on the valve seat 64 to close the motor-driven valve 61.

However, at the moment that the valve body 72 seats on the valve seat 64, the upper closing limit stopper portion 74c does not reach to the lower closing limit stopper portion 71c, so that the rotor 67 is further rotatable. The moment that the rotor 67 further rotates clockwise in top view (indicated by arrows) and the upper closing limit stopper portion 74c contacts with the lower closing limit stopper portion 71c (the condition shown in FIG. 4C-1), the rotation of the rotor 67 is forcibly stopped.

Moreover, when the valve body 72 seats on the valve seat 64, the movement of the valve body 72 stops, but, as described above, since the valve shaft 70 further descends, the coil spring 73 is compressed to press the valve body 72 to the valve seat 64, and the upper closing limit stopper portion 74c contacts with the lower closing limit stopper portion 71c to finish valve closing motion.

The rotor 67 further rotates clockwise in top view from the condition shown in FIG. 4C-1 that the upper closing limit stopper portion 74c contacts with the lower closing limit stopper portion 71c, and then through the resiliency of the coil spring 75, the distance between the projections 75c and 75b gradually becomes small while rotational force of the rotor 67 being absorbed, finally the rotor 67 stops in a condition that the rotational force of the rotor 67 and the resiliency of the coil spring 75 balance (that is the condition shown in FIG. 4C-2 where the rotor 67 rotates further a degree from the condition shown in FIG. 4C-1). With this, an impact when the upper closing limit stopper portion 74c collides against the lower closing limit stopper portion 71c can be relaxed.

On the other hand, when the motor-driven valve 61 is opened, in the state shown in FIG. 4C, to the stator is fed electric current in a direction opposite to the above and is excited, which allows the rotor 67 to rotate counterclockwise in top view and the valve shaft 70 to move upward, allowing the valve body 72 to separate from the valve seat 64 to open the motor-driven valve 61. Then, the rotor 67 further rotates and the lower opening limit stopper portion 77a contacts with the upper opening limit stopper portion 71b, which allows the rotation of the rotor 67 to stop and the rise of the valve body 72 also to stop.

Next, a motor-driven valve according to the fifth embodiment of the present invention will be explained with reference to FIGS. 9A, 9B.

This motor-driven valve 91 has almost the same construction as the motor-driven valve 61 shown in FIGS. 4A to 4C, so that, in FIGS. 9A, 9B, like symbols are applied to like parts of the motor-driven valve 61, and repeated explanations will be omitted. In addition, the construction comprising the rotor 67, the valve shaft 70, the upper closing limit stopper part 74 and the coil spring 75, which is characterizing the present invention, is applied to the motor-driven valve 91 also like the motor-driven valve 61.

The motor-driven valve 91 differs from the motor-driven valve 61 in that: the motor-driven valve 91 is not provided with the coil spring 73 downwardly urging the valve body 72 and the stopper ring 76 of the motor-driven valve 61; a valve body 92 of the motor-driven valve 91 is caulked by and fixed to a lower end portion 93a of a valve body supporting member 93 that is integral with the valve shaft 70; and the valve body 92 and the valve seat 64 do not contact with each other when the valve 91 closes, that is, downward movement of the valve body 92 stops immediately before the valve body 92 seats on the valve seat 64. Such motor-driven valve 91 is, for example, used as a simple flow control valve for a compressor.

Next, the motion of the motor-driven valve 91 with the above construction will be explained with reference to FIGS. 9A, 9B.

When the motor-driven valve 91 is closed, in the state shown in FIG. 9A, to the stator is fed electric current in a direction and is excited, which allows the rotor 67 to rotate clockwise in top view and the valve shaft 70 also to simultaneously rotate downward, as illustrated in a cross-sectional view FIG. 9B, which allows the valve body 92 to stop its dropping motion immediately before seating on the valve seat 64 to close the motor-driven valve 91.

The rotor 67 further rotates clockwise in top view from the condition shown in FIG. 9B-1 that the upper closing limit stopper portion 74c contacts with the lower closing limit stopper portion 71c, and then through the resiliency of the coil spring 75, the distance between the projections 75c and 75b gradually becomes small while rotational force of the rotor 67 being absorbed, finally the rotor 67 stops in a condition that the rotational force of the rotor 67 and the resiliency of the coil spring 75 balance (that is the condition shown in FIG. 9B-2 where the rotor 67 rotates further a degree from the condition shown in FIG. 9B-1). With this, an impact when the upper closing limit stopper portion 74c collides against the lower closing limit stopper portion 71c can be relaxed.

Especially, in this motor-driven valve 91, at a lower end portion of the valve body supporting member 93 is directly caulked by and fixed to the valve body 92, and the coil spring 73 for relaxing like the motor-driven valve 61 is not provided, so that relaxation effect to the impact of the closing limit stopper part by the coil spring 73 is not obtained, therefore, without the coil spring 75, the impact to the closing limit stopper part becomes considerably large, with the coil spring 75, it becomes possible to further efficiently reduce sound caused by the impact to improved housing environment and to lengthen life of the motor-driven valve.

On the other hand, when the motor-driven valve 91 is opened, in the state shown in FIG. 9B, to the stator is fed electric current in a direction opposite to the above and is excited, which allows the rotor 67 to rotate counterclockwise in top view and the valve shaft 70 to move upward, allowing the valve body 92 to separate from the valve seat 64 to open the motor-driven valve 91. Then, the rotor 67 further rotates and the lower opening limit stopper part 77a contacts with the upper opening limit stopper part 71b, which allows the rotation of the rotor 67 to stop and the rise of the valve body 92 also to stop.

Next, a motor-driven valve according to the sixth embodiment of the present invention will be explained with reference to FIGS. 10A to 14.

Figure 10A:
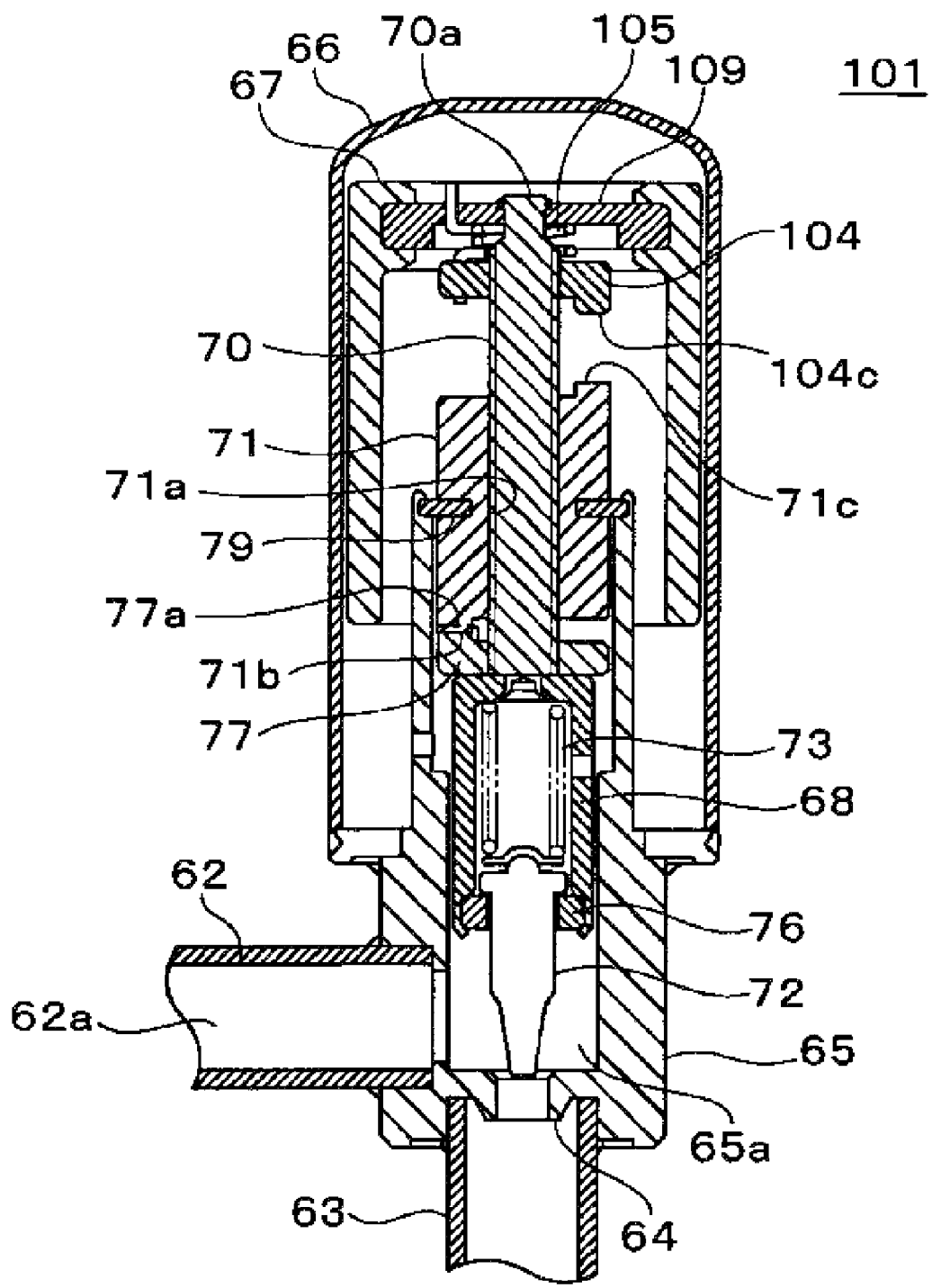

This motor-driven valve 101 has almost the same main parts as the motor-driven valve 61 shown in FIGS. 4A to 4C, so that, in FIGS. 10A to 10C, like symbols are applied to like constituents of the motor-driven valve 61, and repeated explanations will be omitted.

The motor-driven valve 101 differs from the motor-driven valve 61 in a section with an upper closing limit stopper part 104, a coil spring 105 and a support ring 109 that are mounted to the upper end portion 70a of the valve shaft 70 of the motor-driven valve 101.

Figure 11A:
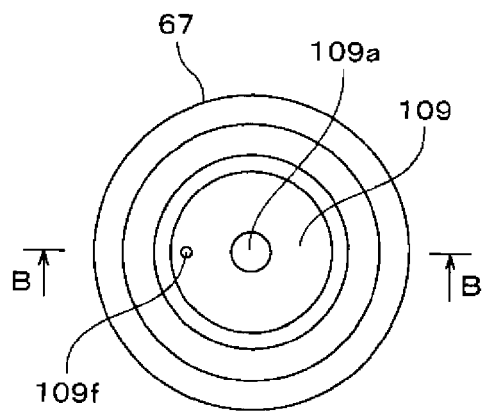
FIGS. 11A to 11C show a rotor, to which a support ring is integrally formed, of the motor-driven valve shown in FIGS. 10A to 10C.
Figure 11B:
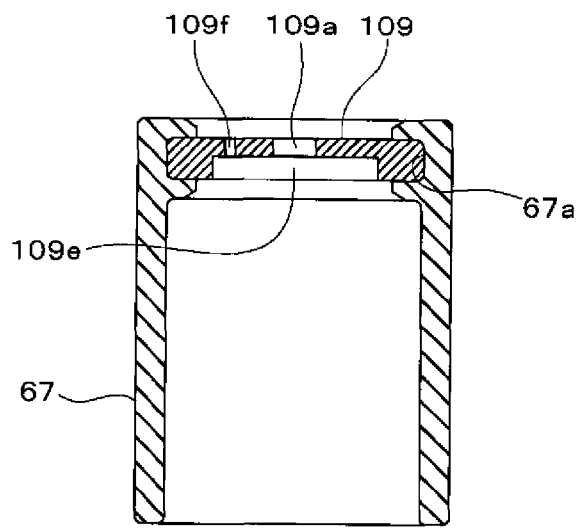
Figure 11C:
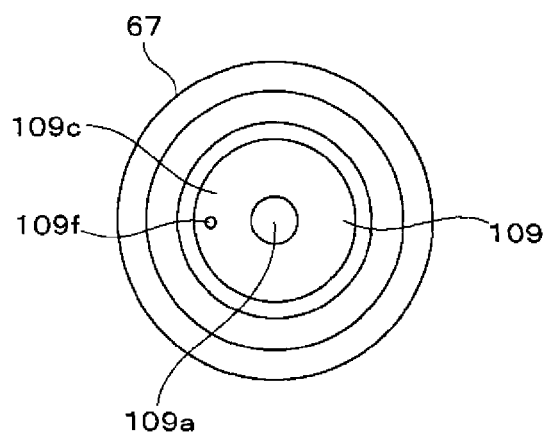

FIGS. 11A to 11C shows a condition that at an upper portion of the rotor 67 is fixed the support ring 109. To the channel portion 67a of the rotor 67 is accommodated and fixed the outer peripheral edge portion of the disk-like support ring 109. At the central portion of the support ring 109 is drilled a hole portion 109a, and the support ring 109 is further provided with a spring accommodating portion 109c for accommodating the whole of the coil spring 105 (shown in FIGS. 12A to 12C) and a hole portion 109f for fixing a projecting portion 105b of the coil spring 105 inserted therein. It is also possible to integrally form the support ring 109 with the rotor 67 at the formation of the rotor 67, in such a case, a metal bush may be mounted to a central portion including the hole portion 109a only.

Figure 12A:
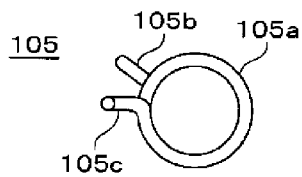
FIGS. 12A to 12C show a coil spring used for the motor-driven valve shown in FIGS. 10A to 10C.
Figure 12B:
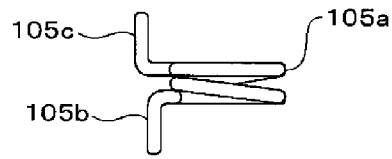
Figure 12C:
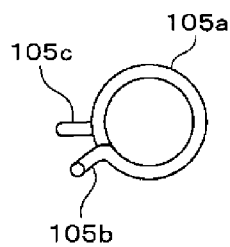
Figure 13A:
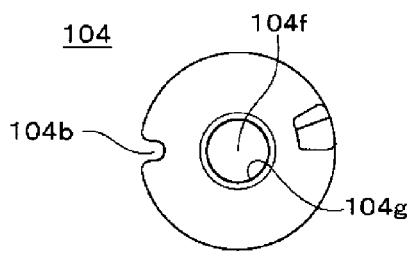
FIGS. 13A to 13D show an upper closing limit stopper used for the motor-driven valve shown in FIGS. 10A to 10C.
Figure 13B:
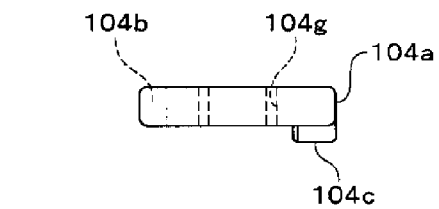
Figure 13D:
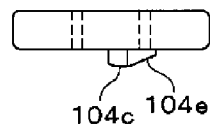
Figure 13C:
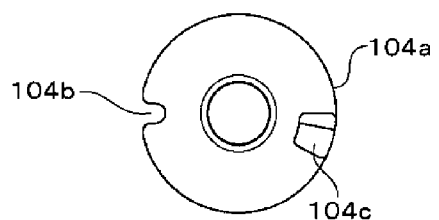

The coil spring 105 accommodated in the spring accommodating portion 109c of the support ring 109 is, as shown in FIGS. 12A to 12C, provided with projecting portions 105b, 105c that are upper and lower end portions of a spring main body 105a projects outside. A tip portion of the projecting portion 105c is inserted into the hole portion 109f of the support ring 109 to prevent the whole of the coil spring 105 from idling in the spring accommodating portion 109c. In addition, the projecting portion 105b is inserted into a notched portion 104b of the upper closing limit stopper part 104 (shown in FIGS. 13A to 13D).

As illustrated in FIGS. 13A to 13D, to the upper closing limit stopper part 104 is screwed a female screw portion 104g at a hole portion 104f that is drilled at the central portion of a ring-shaped base portion 104a. On the left side face of the upper closing limit stopper part 104 is formed the notched portion 104b, and on the bottom face thereof projects an upper closing limit stopper portion 104c, which is provided with an inclined face 104e.

Figure 14:
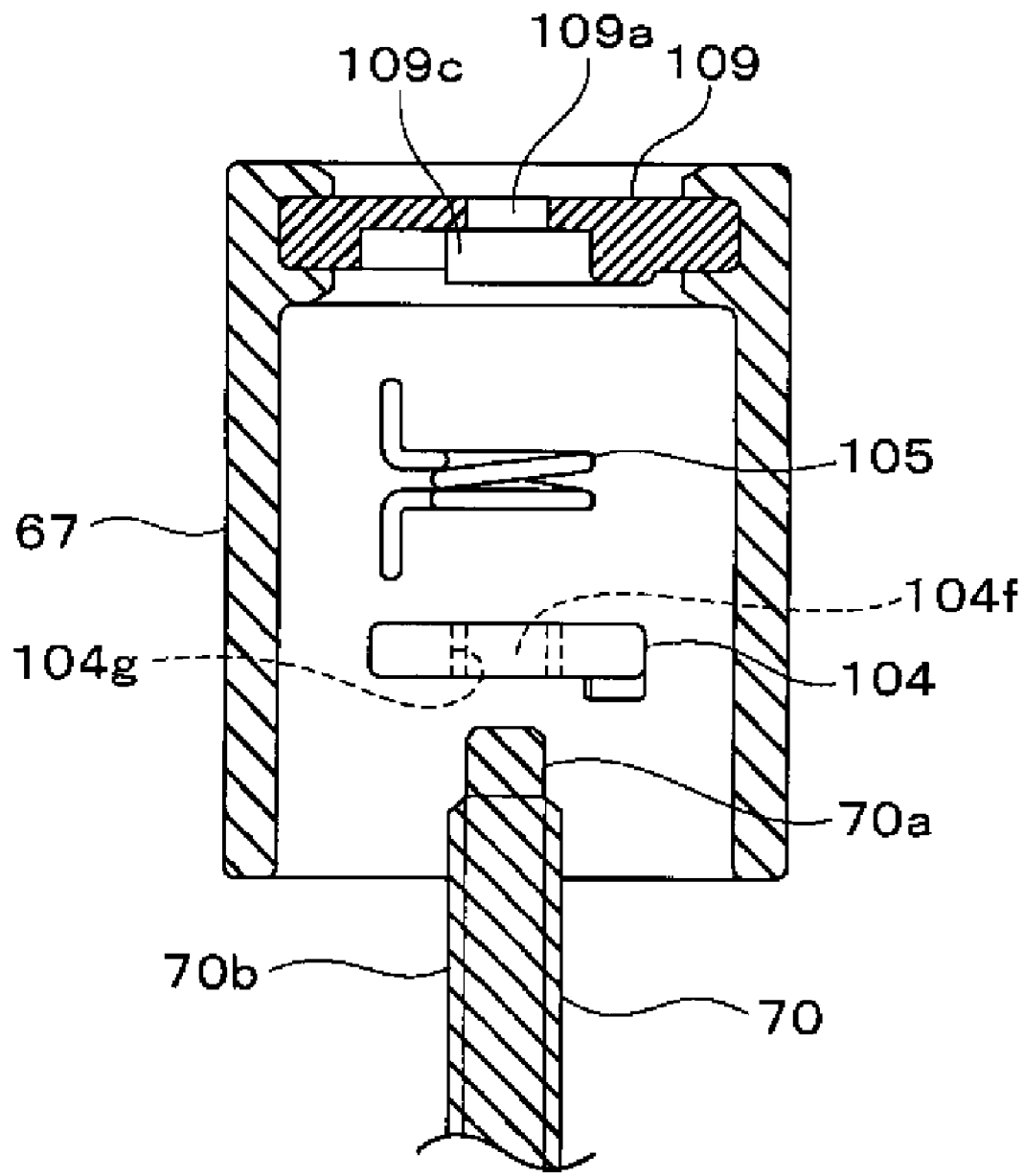
FIG. 14 is a fragmented cross-sectional view for explaining a manner to mount the parts shown in FIG. 11A to 13D to a valve shaft.
Figure 15:
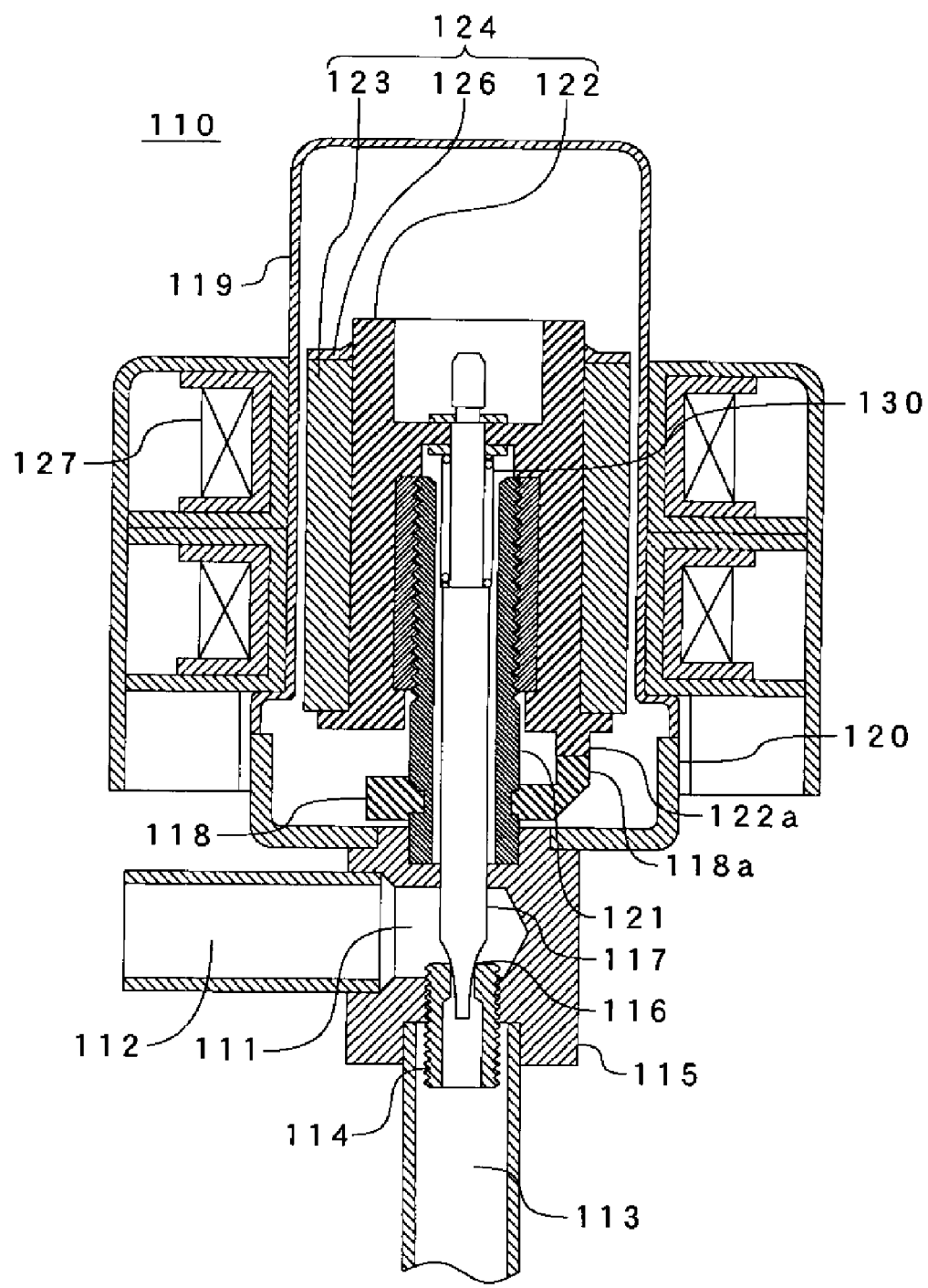
FIG. 15 is a cross-sectional view of a conventional motor-driven valve.

When mounting the support ring 109 (shown in FIGS. 11A to 11C) to which the rotor 67 is integrally formed, the upper closing limit stopper part 104 (shown in FIGS. 13A to 13D) and the coil spring 105 (shown in FIGS. 12A to 12C) to the valve shaft 70, as shown in FIG. 14, after the valve shaft 70 is inserted from the upper end portion 70a side into the hole portion 104f of the upper closing limit stopper part 104, with the male screw portion 70b is engaged the female screw portion 104g, and under the condition that the coil spring 105 is accommodated in the spring accommodating portion 109c of the support ring 109, the upper end portion 70a of the valve shaft 70 is inserted into the hole portion 109a of the support ring 109 to obtain the condition shown in FIG. 10A, and the upper end portion 70a of the valve shaft 70 is fixed to the top face of the support ring 109.

Next, the motion of the motor-driven valve 101 with the above construction will be explained with reference to FIGS. 10A to 10C.

When the motor-driven valve 101 is closed, in the state shown in FIG. 10A, to the stator is fed electric current in a direction and is excited, which allows the rotor 67 to rotate clockwise in top view (indicated by arrows) and the valve shaft 70 also to simultaneously rotate downward, via an intermediate valve opening state shown in FIG. 10B, as illustrated in the cross-sectional view FIG. 10C, which allows the valve body 72 to seat on the valve seat 64 to close the motor-driven valve 101.

However, at the moment that the valve body 72 seats on the valve seat 64, the upper closing limit stopper portion 104c does not reach to the lower closing limit stopper part 71c, the rotor 67 is further rotatable. The moment that the rotor 67 further rotates clockwise in top view (indicated by arrows) and the upper closing limit stopper portion 104c contacts with the lower closing limit stopper part 71c (the condition shown in FIG. 10C-1), the rotation of the rotor 67 is forcibly stopped.

Moreover, when the valve body 72 seats on the valve seat 64, the movement of the valve body 72 stops, but, as described above, since the valve shaft 70 further descends, the coil spring 73 is compressed to press the valve body 72 to the valve seat 64, and the upper closing limit stopper portion 104c contacts with the lower closing limit stopper part 71c to finish valve closing motion.

The rotor 67 further rotates clockwise in top view from the condition shown in FIG. 10C-1 that the upper closing limit stopper portion 104c contacts with the lower closing limit stopper part 71c, and then through the resiliency of the coil spring 105, the distance between the projections 105c, 105b gradually becomes small while rotational force of the rotor 67 being absorbed, finally the rotor 67 stops in a condition that the rotational force of the rotor 67 and the resiliency of the coil spring 105 balance (that is the condition shown in FIG. 10C-2 where the rotor 67 rotates further a degree from the condition shown in FIG. 10C-1). With this, an impact when the upper closing limit stopper portion 104c collides against the lower closing limit stopper part 71c can be relaxed.

On the other hand, when the motor-driven valve 101 is opened, in the state shown in FIG. 10C, to the stator is fed electric current in a direction opposite to the above and is excited, which allows the rotor 67 to rotate counterclockwise in top view and the valve shaft 70 to move upward, allowing the valve body 72 to separate from the valve seat 64 to open the motor-driven valve 101. Then, the rotor 67 further rotates and the lower opening limit stopper part 77a contacts with the upper opening limit stopper part 71b, which allows the rotation of the rotor 67 to stop and the rise of the valve body 72 also to stop.

In the above embodiment, although the cases that the coil springs 75, 105 are accommodated in the support rings 69, 109 fixed to the upper portion of the rotor 67 are explained, in a motor-driven valve without the support rings 69, 109 and with the rotor 67 and the valve shaft 70 being directly connected with each other, the coil springs 75, 105 can be accommodated in the rotor 67 itself.

Further, in the above embodiment, the valve shaft 70 and the spring accommodating portion 68 or the valve body supporting member 93 are formed as separate parts, and at the lower end portion of the valve shaft 70 is fixed the spring accommodating portion 68 or the ceiling portion of the valve body supporting member 93 through caulking, as examples, the valve shaft 70 and the spring accommodating portion 68 or the valve body supporting member 93 may integrally be formed with each other.

Still further, although in the above embodiment, the first screw member fixed to the valve main body is a female screw member, and the second screw member engaging with the first screw member is a male screw member, the first screw member can be a male screw member and the second screw member may be a female screw member.

Further, without drawings, in the motor-driven valves according to the first to third embodiments of the present invention shown in FIGS. 1A to 3B, it is possible that, in place of the support ring 9, the support ring 69, the upper closing limit stopper part 74 and the coil spring 75 of the motor-driven valve according to the fourth embodiment of the present invention shown in FIGS. 4A to 10C, or the support ring 109, the upper closing limit stopper part 104 and the coil spring 105 in the sixth embodiment can be adapted to relax the impact when the upper closing limit stopper portion (9a) collide against the lower closing limit stopper portion (11d).

What is claimed is:

1. A motor-driven valve comprising:
a male screw member rotating in accordance with a rotation of a rotor of an electric motor and engaging with a female screw member fixed to a valve main body;
a valve body contacting to and separating from a valve seat in the valve main body by a rotation of the male screw member;
two stopper parts rotating in accordance with the rotation of the rotor of the electric motor, at least one of said two stopper parts being screwed with the male screw member;
an opening limit stopper part mounted to the female screw member, said opening limit stopper part contacting with one of the two stopper parts in a fully-opened state of said motor-driven valve to restrict the rotation of the male screw member in a direction that the motor-driven valve opens; and
a closing limit stopper part mounted to the female screw member, said closing limit stopper part contacting with another stopper part in a fully-closed state of said motor-driven valve to restrict the rotation of the male screw member in a direction that the motor-driven valve closes.

2. The motor-driven valve as claimed in claim 1, wherein said another stopper part contacting with the closing limit stopper part of the female screw member is mounted to one of a support ring for connecting the rotor and the male screw member, and the rotor.

3. The motor-driven valve as claimed to claim 1, wherein said another stopper part contacting with the closing limit stopper part of the female screw member is mounted on a side surface of the male screw member.

4. The motor-driven valve as claimed in claim 1, wherein said opening and closing limit stopper parts are integrally formed with the female screw member.

5. The motor-driven valve as claimed in claim 1, wherein between the male screw member and the valve body is mounted a spring accommodating part with a larger outer diameter than that of the male screw member and with is coil spring therein, and said coil spring urges the valve body toward the valve seat, and on an outer surface of said spring accommodating part on the rotor side is mounted said one of the two stopper parts.

6. A motor-drive valve comprising:
a male screw member rotating in accordance with a rotation of a rotor or an electric motor and engaging with a female screw member fixed to as a valve main body;
a valve body contacting with and separating from a valve seat in the valve main body by a rotation of the male screw member;
two stopper parts rotating in accordance with the rotation of the rotor of the electric motor, at least one of said two stopper being screwed with the male screw member;
an opening limit stopper part mounted to the female screw member, said opening limit stopper part contacting with one of the two stopper parts in a fully-opened state of said motor-driven valve to restrict the rotation of the male screw member in as direction that the motor-driven valve opens;
closing limit stopper part mounted to the female screw member, said closing limit stopper part contacting with another stopper part in a fully-closed state of said motor-driven valve to restrict the rotation of the male screw member in a direction that the motor-driven valve closes; and
a shock, absorbing member relaxing an impact when said another stopper part collides against the closing limit stopper part.

7. A motor-driven valve comprising:
a male screw member rotating in accordance with a rotation of as rotor of an electric motor and engaging with as female screw member fixed to a valve main body;
a valve body contacting to and separating from a valve seat in the valve main body by a rotation of the male screw member;
two stopper parts rotating in accordance with the rotation of the rotor of the decide motor;
an opening limit stopper part mounted to the female screw member, said opening limit stopper part contacting with one of the two stopper parts in a fully-opened state of said motor-driven valve to restrict the rotation of the male screw member in a direction that the motor-driven valve opens; and
a closing limit stopper part mounted to the female screw member, said closing limit stopper part contacting with another stopper part in a fully-closed state of said motor-driven valve to restrict the rotation of the male screw member in a direction tint the motor-driven valve closes;
wherein between the male screw member and the valve body is mounted a spring accommodating part with a larger outer diameter than that of the male screw member and with a coil spring therein, and said coil spring urges the valve body toward the valve seat, and on an outer surface of said spring accommodating part on the rotor side is mounted said one of the two stopper parts.

8. The motor-driven valve as claimed in claim 7, wherein said another stopper part contacting with the closing limit stopper part of the female screw member is mounted to one of a support ring for connecting the rotor and the male screw member, and the rotor.

9. The motor-driven valve as claimed in claim 7, wherein said another stopper part contacting with the closing limit stopper part of the female screw member is mounted on a side surface of the male screw member.

10. The motor-driven valve as claimed in claim 7, wherein said opening and closing limit stopper parts are integrally formed with the female screw member.

* * * * *